Figure 5:
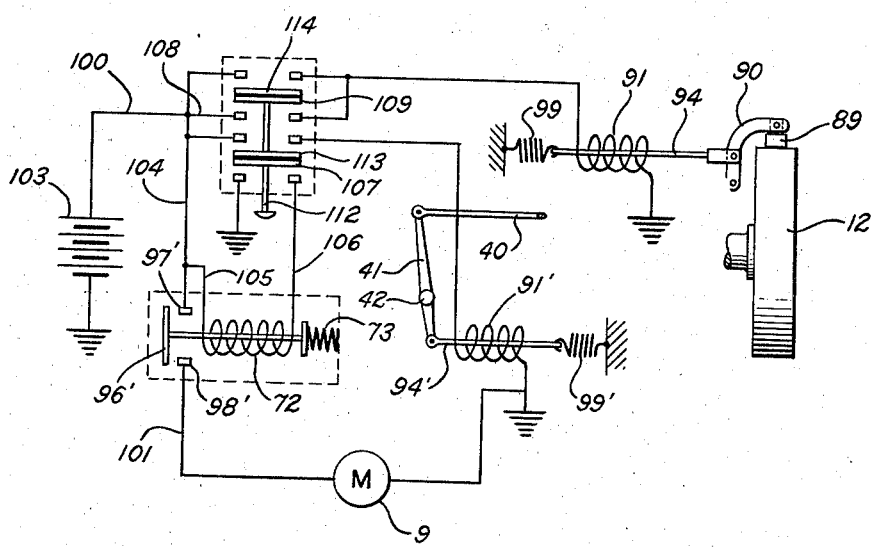

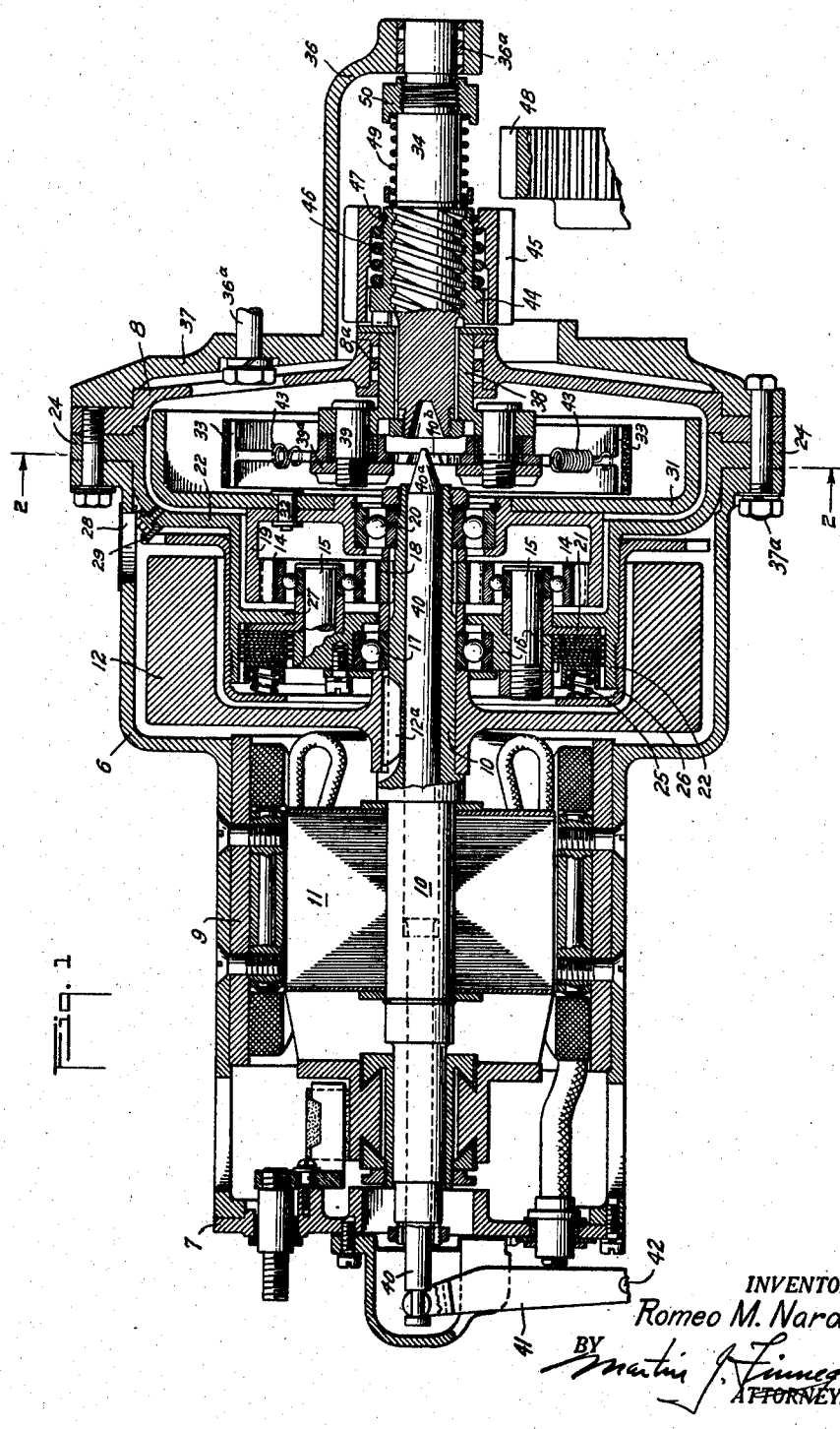

June 11, 1940.  R. M. NARDONE  2,203,795
ENGINE STARTER
Filed June 11, 1937  3 Sheets-Sheet 2
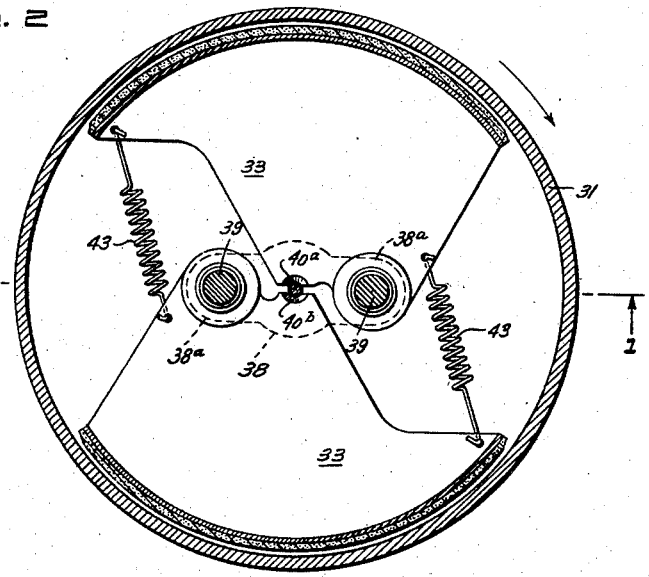
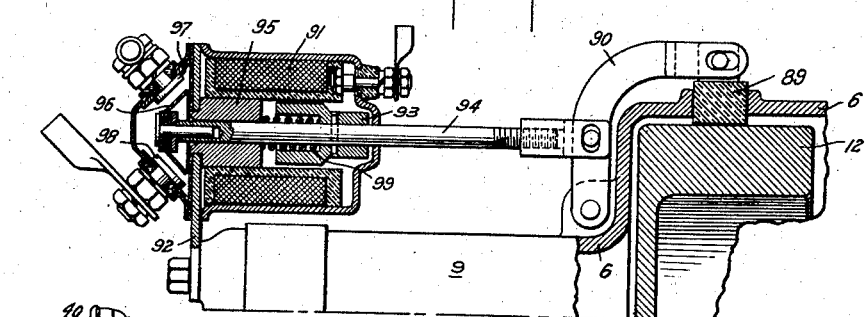
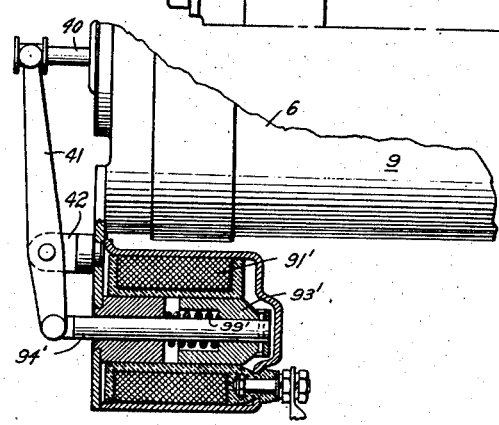
INVENTOR.
Romeo M. Nardone
BY
ATTORNEY.

June 11, 1940.  R. M. NARDONE  2,203,795
ENGINE STARTER
Filed June 11, 1937  3 Sheets-Sheet 3

INVENTOR.
Romeo M. Nardone
BY Martin J. Finnegan
ATTORNEY.

112, the plates 109 and 107 moving in unison to the circuit closing positions. The brake 89 being thus released, and the motor 9 being energized, shaft 10 and flywheel 12 are rotated.

When sufficient energy has been built up in flywheel 12, the control switch 112 is shifted to its upper position, thereby bringing conducting plate 113 into position to close a circuit to the solenoid 91' while at the same time bringing conducting plate 114 into position to maintain the brake releasing solenoid 91 energized. Energization of solenoid 91' causes the lower end of lever 41 to be moved to the left, thus moving rod 40 to the right and shoes 33 radially into driving engagement with drum 31 whereby shaft 34 is rotated. Upon the initial rotation of shaft 34, the inertia of driving unit 44, 45 causes said unit to move longitudinally on shaft 34, compressing spring 49, whereby pinion 45 meshes with flywheel gear 48 and engages stop nut 50. The driving unit now rotates with shaft 34 and the engine is cranked.

When the engine starts, flywheel gear 48 will drive pinion 45 and this overrunning action will return the driving unit to the demeshed position shown in Fig. 1. Thereupon the operator allows switch 112 to return to the neutral position indicated in Fig. 5, thereby de-energizing the solenoid 91 and permitting the brake shoe 89 to take hold upon the flywheel 12 under the urge of spring 99. The resultant stoppage of the flywheel and the gears and other parts rotated thereby, including the screw shaft 34, eliminates any tendency which the thread of the screw shaft might otherwise have to induce a re-drift of the pinion 45 into objectionable contact with the now rapidly rotating teeth of the gear 48. Thus the application of the brake 89 serves as a supplement to the spring 49 in reducing any such redrifting tendency on the part of the pinion 45.

The self-energizing clutch 33, 34 tends to form a positive driving connection between the flywheel and the pinion 45, but the various elements of the starter are protected from overload by the preset clutch 21, 22, 26, which may be accurately adjusted to transmit a desired amount of torque.

What is claimed is:

1. In an apparatus of the class described, an electric motor, means including a friction clutch for transmitting energy developed in said motor to a member of an engine to be started, said transmitting means further including a threaded shaft adapted to be rotatably driven by said friction clutch, a sleeve threaded on said shaft for rotary and longitudinal movement thereon, a pinion mounted on and splined to said sleeve for axial movement relative thereto, and for rotary movement therewith, said axial movement being adapted to produce operative engagement between said pinion and said engine member, and resilient means for resisting said relative axial movement, said resilient means having engagement at one end with said sleeve and at its opposite end with said pinion, and being positioned between said sleeve and pinion.

2. In an apparatus of the class described, the combination with a driving drum, of means including friction shoes engageable with said drum to transmit energy stored in said drum to a member of an engine to be started, a driven shaft rotatable with said friction shoes and having a threaded portion, a sleeve threaded on said shaft, said sleeve being adapted to move longitudinally of said shaft and to rotate in relation thereto, a pinion splined to the periphery of said sleeve for axial movement in relation thereto to establish driving connection with said engine member, a ring for limiting said axial movement in one direction, and resilient means for limiting and resisting said axial movement in the other direction.

ROMEO M. NARDONE.